(12) United States Patent
Kim et al.

(10) Patent No.: US 7,532,585 B2
(45) Date of Patent: May 12, 2009

(54) METHOD OF ELECTING A LEADER IN AN AD-HOC NETWORK

(75) Inventors: Jae-hoon Kim, Seoul (KR); Youn-hee Han, Guri-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 703 days.

(21) Appl. No.: 10/962,518

(22) Filed: Oct. 13, 2004

(65) Prior Publication Data

US 2005/0094574 A1 May 5, 2005

(30) Foreign Application Priority Data

Nov. 4, 2003 (KR) .................. 10-2003-0077700

(51) Int. Cl.
*H04L 12/28* (2006.01)
(52) U.S. Cl. ....................... 370/254; 370/400
(58) Field of Classification Search .............. None
See application file for complete search history.

(56) References Cited

U.S. PATENT DOCUMENTS

| | | | | |
|---|---|---|---|---|
| 6,829,222 | B2 * | 12/2004 | Amis et al. .................. 370/238 |
| 2002/0018448 | A1 * | 2/2002 | Amis et al. .................. 370/255 |
| 2003/0202465 | A1 * | 10/2003 | Cain ........................ 370/225 |
| 2003/0204625 | A1 * | 10/2003 | Cain ........................ 709/243 |
| 2005/0063313 | A1 * | 3/2005 | Nanavati et al. ............ 370/252 |
| 2005/0132154 | A1 * | 6/2005 | Rao et al. ................... 711/162 |
| 2006/0034193 | A1 * | 2/2006 | Shi et al. .................... 370/255 |

OTHER PUBLICATIONS

Pardeep Parvathipuram, Vijay Kumar, Gi-Chul Yang, "An Efficient Leader Election Algorithm for Mobile Ad Hoc Networks", Springer Berlin/Heidelberg, vol. 3347, 2004, pp. 32-41.*
Sudarshan Vasudevan, Jim Kurose, Don Towsley, "Design and Analysis of a Leader Election Algorithm for Mobile Ad Hoc Networks", UMass Computer Science Technical Report 3-20, 2004, Entire document.*
P. Basu, N. Khan, T.D.C. Little, " A Mobility Based Metric for Clustering in Mobile Ad Hoc Networks", MCL Technical Report No. 01-15-2001, 2001, Entire Document.*
Kilian Weniger, Martina Zitterbart, "IPv6 Autoconfiguration in Large Scale Mobile Ad-Hoc Networks", European Wireless 2002, vol. 1, Feb. 2002, pp. 144-147.*
Navneet Malpani, Jennifer Welch, Nitin Vaidya, "Leader Election Algorithm for Mobile Ad Hoc Networks", in Proceedings of the 4th International Workshop on Discrete Algorithms and Methods for Mobile Computing and Communication, Boston 2000, pp. 96-103.*

* cited by examiner

*Primary Examiner*—Chirag G Shah
*Assistant Examiner*—Suk Jin Kang
(74) *Attorney, Agent, or Firm*—Staas & Halsey LLP (57) ABSTRACT

A method of electing a leader node in an ad-hoc network including a plurality of nodes in the ad-hoc network transmitting node solicitation (NS) messages and calculating distances between the plurality of nodes using information included in the NS messages, determining whether the plurality of nodes are candidate leaders by calculating center position values based on the distances calculated by each of the nodes, and electing the leader node based on information included in leader election option messages transmitted by each candidate leader.

28 Claims, 5 Drawing Sheets

| 1-HOP | 2-HOP | 3-HOP | 4-HOP | 5-HOP | 6-HOP | 7-HOP | 8-HOP | 9-HOP | 10-HOP | LEADER STATE |
|---|---|---|---|---|---|---|---|---|---|---|
| NUMBER OF NEIGHBOR | NUMBER OF NEIGHBOR | NUMBER OF NEIGHBOR | NUMBER OF NEIGHBOR | NUMBER OF NEIGHBOR | NUMBER OF NEIGHBOR | NUMBER OF NEIGHBOR | NUMBER OF NEIGHBOR | NUMBER OF NEIGHBOR | NUMBER OF NEIGHBOR | LEADER |

FIG. 3

| TYPE(REQUEST, UPDATE) | LENGTH | L | A | U | METRIC. (TIME, POWER,....) |
|---|---|---|---|---|---|
| # OF 1-HOP NEIGHBOR | # OF 2-HOP NEIGHBOR | | | # OF 3-HOP NEIGHBOR | # OF 4-HOP NEIGHBOR |
| # OF 5-HOP NEIGHBOR | # OF 6-HOP NEIGHBOR | | | # OF 7-HOP NEIGHBOR | # OF 8-HOP NEIGHBOR |
| # OF 9-HOP NEIGHBOR | # OF 10-HOP NEIGHBOR | | | RESERVED(FOR NETWORK SCALABILITY) | |
| RESERVED(FOR NETWORK SCALABILITY) | | | | | |
| RESERVED(FOR NETWORK SCALABILITY) | | | | | |

NEIGHBOR NODE INFORMATION LIST OF NODE 406

| 1-HOP | 2-HOP | 3-HOP | 4-HOP | 5-HOP | 6-HOP | 7-HOP | 8-HOP | 9-HOP | 10-HOP | LEADER STATE |
|---|---|---|---|---|---|---|---|---|---|---|
| 4 | 7 | 4 | 0 | 0 | 0 | 0 | 0 | 0 | 0 | LEADAER |

NEIGHBOR NODE INFORMATION LIST OF NODE 407

| 1-HOP | 2-HOP | 3-HOP | 4-HOP | 5-HOP | 6-HOP | 7-HOP | 8-HOP | 9-HOP | 10-HOP | LEADER STATE |
|---|---|---|---|---|---|---|---|---|---|---|
| 4 | 5 | 4 | 2 | 0 | 0 | 0 | 0 | 0 | 0 | |

NEIGHBOR NODE INFORMATION LIST OF NODE 412

| 1-HOP | 2-HOP | 3-HOP | 4-HOP | 5-HOP | 6-HOP | 7-HOP | 8-HOP | 9-HOP | 10-HOP | LEADER STATE |
|---|---|---|---|---|---|---|---|---|---|---|
| 4 | 4 | 3 | 3 | 1 | 0 | 0 | 0 | 0 | 0 | |

METHOD OF ELECTING A LEADER IN AN AD-HOC NETWORK

CROSS-REFERENCE TO RELATED APPLICATION

This application claims the priority of Korean Patent Application No. 2003-77700 filed Nov. 4, 2003 in the Korean Intellectual Property Office, the disclosure of which is incorporated herein by reference.

BACKGROUND OF THE INVENTION

1. Field of the Invention

The present invention generally relates to a method of electing a leader in an ad-hoc network. More particularly, the present invention relates to a method of electing a leader node in an ad-hoc network capable of electing a suitable leader node in accordance with the circumstances such as the creation of an ad-hoc network, topology change of the ad-hoc network, and movement of a general node and the leader node.

2. Description of the Related Art

With the development of mobile communication appliances and communication techniques, in addition to the existing infrastructure network, the necessity for a small-sized wireless communication network has increased. Specifically, in environments where the network is isolated from an external Internet and no wire equipment is provided, for example, in a state of emergency, in an airplane, in a building, or in a mountainous region, a small-sized wireless communication network such as an ad-hoc network is greatly required.

In the ad-hoc network, unlike the infrastructure network, a router that repeats a packet transmission/reception does not exist separately, but each mobile node serves as a host and a router simultaneously. Since a node in the ad-hoc network is provided with wireless communication equipment, the movement of the node from one ad-hoc network to another network becomes possible, and this causes the topology of the ad-hoc network to be changed.

In the ad-hoc network, the transmission range of radio waves for each node is limited, and thus a packet may not be directly transmitted from its departure node to its destination node. In this case, the packet is transmitted via a plurality of nodes that serve as routers. This system is called a multi-hop system, and a routing protocol for implementing the multi-hop system is required in the ad-hoc network.

A node that takes part in the ad-hoc network should be allocated with an address to be used in the corresponding ad-hoc network. For this, the node generates a temporary address in the same manner as an automatic address generation, and performs a Duplicate Address Detection (DAD) to confirm whether the generated address is the sole address in the corresponding ad-hoc network.

The DAD starts when the node floods a Neighbor Solicitation (NS) message that includes an address generated by the node itself into the whole network, and succeeds if the node fails to receive a Neighbor Advertisement (NA) message from a node that uses the same address within a time limit. If the DAD succeeds, the corresponding node performs a communication in the ad-hoc network using the confirmed address.

Since a fixed router does not exist separately in the ad-hoc network and each node serves as a router and a host simultaneously, the communication between the nodes is performed without any central control. The communication between the nodes is performed in a manner that a departure node transmits a desired packet to the whole network and a designated destination node receives the packet directly or via another node.

Technical research in the ad-hoc network field has mainly been made with respect to an efficient routing method such as a method of supporting a network environment using an Internet Protocol (IP) that is an Internet addressing system. However, research for the configuration and management of an ad-hoc network is actively being performed.

Accordingly, by introducing the concept of a leader node for the configuration and management of the ad-hoc network, the DAD is efficiently performed in the ad-hoc network and an easy scalability of the network is sought by sending a Router Advertisement (RA) message.

There is no dominance among nodes that independently perform their communications as simultaneously serving as routers and hosts in the ad-hoc network. Thus, a leader node has to be elected among the nodes suitable to serve as a leader node in accordance with a certain method.

There is a conventional method of electing a leader node that gives a predetermined number to each node that takes part in the ad-hoc network as an Identification (ID) and elects the leader node by comparing such IDs with one another. However, since these IDs are given irrespective of the positions of each node according to the topology of the ad-hoc network, the leader node electing method does not reflect the topology of the network. Thus, the leader node elected by the conventional method cannot contribute to the transmission of the RA message and the shortening of time for the DAD performing transmission.

There is another conventional method, which elects a node having the largest number of neighbor nodes as a leader node. Such a leader node electing method uses information on neighbor nodes in order to elect the leader node, but it does not consider the topology of the whole ad-hoc network. Accordingly, it has the drawback in that it cannot reflect the topology of the whole ad-hoc network. When the leader node becomes unsuitable for its own role due to the change of the topology of the network and the change of the number of neighbor nodes for each node, because the leader node once elected cannot be replaced, the conventional method cannot cope with the change of the network topology.

In addition to the two above-described conventional methods of electing a leader node, there is another leader node electing method based on a Temporally-Ordered Routing Algorithm (TORA), that is, an ad-hoc routing protocol. However, this method, being based on a predetermined routing protocol, is inapplicable to other routing protocols except for the TORA.

SUMMARY OF THE INVENTION

An aspect of the present invention is to solve at least the above and/or other problems and disadvantages and to provide at least the advantages described below.

According to an aspect of the present invention, there is provided a method of electing a leader node in an ad-hoc network that can variably elect a suitable leader node in accordance with circumstances such as topology change of the ad-hoc network, and movement of a general node and the leader node, by reflecting the topology of the ad-hoc network and determining the suitability of the elected leader node according to the topology change of the network.

The foregoing and/or other objects and advantages are substantially realized by providing a method of electing a leader node in an ad-hoc network, according to certain embodiments of the present invention, including calculating distances to transmitting nodes that transmit node solicitation (NS) messages using information included in the NS messages transmitted by the transmitting nodes from a plurality of nodes in the ad-hoc network, determining whether the nodes themselves are candidate leaders by calculating center position values based on the distances calculated by each node, and electing the leader node based on information included in leader election option messages transmitted by each candidate leader.

According to the aspect of the present invention, the method further includes preparing neighbor node information lists based on distances calculated by each node. The distances are calculated by the numbers of hops, which are the numbers of transmissions of the NS messages from the transmitting nodes, using hop limit information included in Internet protocol (IP) headers of the NS messages.

According to an aspect of the present invention, the neighbor node information list of each node includes the number of the transmitting nodes located at a distance corresponding to the number of hops "K" from each node, wherein "K" is a natural number. The leader election option messages transmitted by each candidate node include the neighbor node information lists.

According to an aspect of the present invention, the candidate node having the largest value obtained from a following equation, which is calculated according to the neighbor node information lists of each candidate node, is elected as the leader:

$$\sum_{K=1}^{M} \alpha_K * N_K$$

wherein "M" denotes a predetermined natural number, "$\alpha_K$" denotes a weight value, and "$N_K$" denotes the number of transmitting nodes located at a distance corresponding to the number of hops "K" from the candidate nodes.

According to an aspect of the present invention, the nodes that satisfy the following equation are determined as the candidate nodes:

$$\sum_{K=1}^{M} \alpha_K * N_K \geq T$$

wherein "M" denotes a predetermined natural number, "T" denotes a predetermined threshold value, "$\alpha_K$" denotes a weight value, and "$N_K$" denotes the number of transmitting nodes located at a distance corresponding to the number of hops "K" from the candidate nodes.

According to an aspect of the present invention, the method includes the elected leader periodically transmitting a hello message informing that the elected node is the leader, each node that has failed to receive the hello message determining whether the node itself is the candidate leader based on the neighbor node information list, and the node that is determined not to be the candidate leader determining to be the candidate node if the node has failed to receive the leader election option message from any other candidate node for a predetermined time.

According to an aspect of the present invention, the method includes a new node taking part in the ad-hoc network and transmitting an NS message, requesting the neighbor node information lists to the other existing nodes, and preparing its own neighbor node information list, and the existing nodes calculating distances to the new node using information included in the received NS message from the new node and updating their neighbor node information lists, respectively.

According to an aspect of the present invention, the method includes the leader node transmitting the leader election option message if it satisfies the following equation:

$$OP = \sum_{K=1}^{M} \alpha_K * N_K \Big) T'$$

wherein "I" denotes a predetermined natural number larger than "1", "M" denotes a certain natural number larger than "I", "$\alpha_K$" denotes a weight value, "$N_K$" denotes the number of neighbor nodes located at a distance corresponding to the number of hops "K" from the leader node, and "T" denotes a predetermined threshold value.

According to another aspect of the present invention, there is provided a computer readable medium encoded with processing instructions performing a method of electing a leader node in an ad-hoc network, the method including: a plurality of transmitting nodes in the ad-hoc network transmitting node solicitation (NS) messages and calculating distances between the plurality of transmitting nodes using information included in the NS messages transmitted from the plurality of transmitting nodes; determining whether the plurality of transmitting nodes themselves are candidate leaders by calculating center position values based on the distances calculated between each of the plurality of transmitting nodes; and electing the leader node based on information included in leader election option messages transmitted by each of the candidate leaders.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
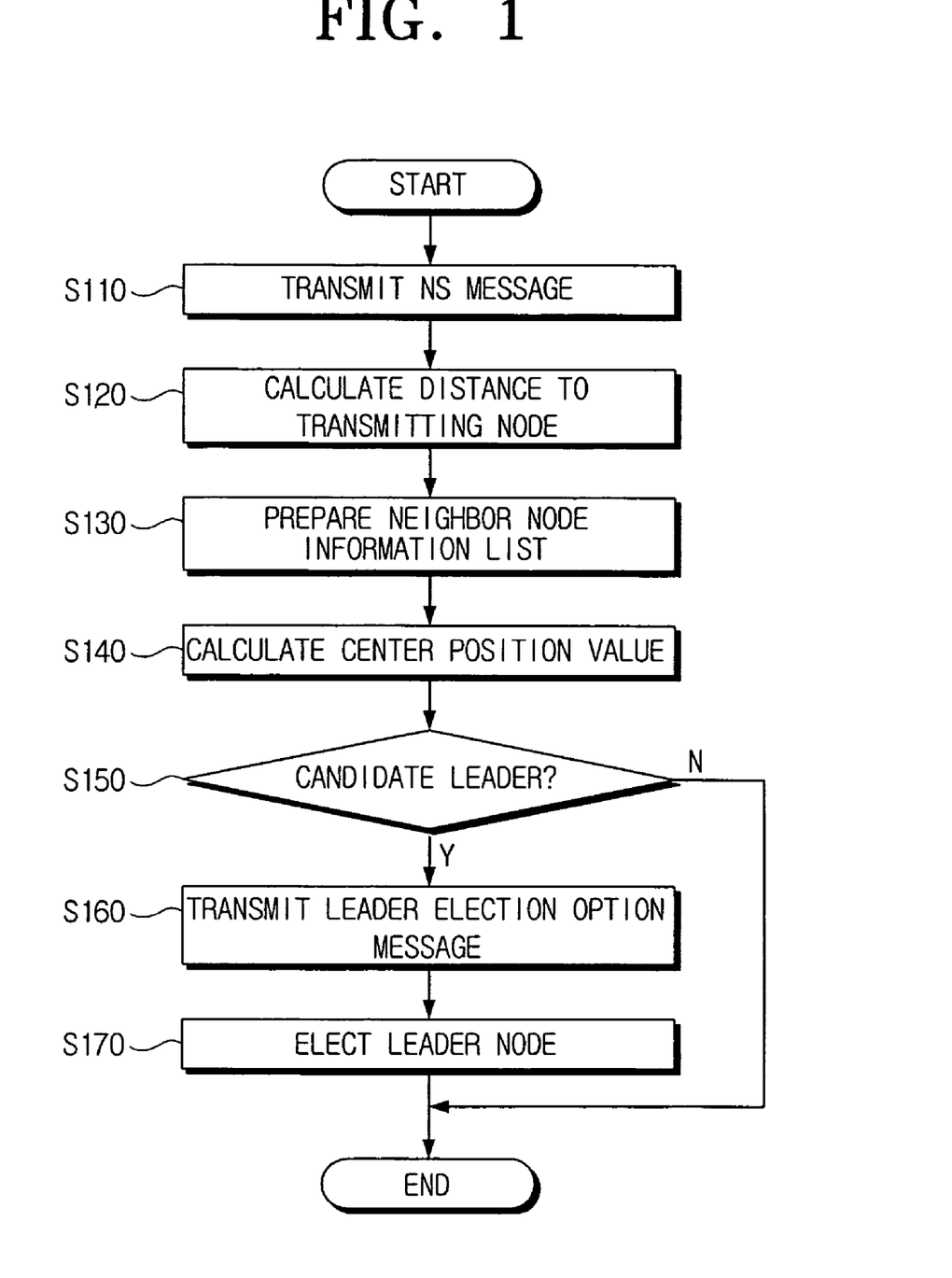
FIG. 1 is a flowchart illustrating a method of electing a leader node in an ad-hoc network according to an embodiment of the present invention.

FIG. 1 is a flowchart illustrating a method of electing a leader node in an ad-hoc network according to an embodiment of the present invention. Referring to FIG. 1, a node, which takes part in an ad-hoc network when the network is created, generates its own address to be used in the network and transmits a Neighbor Solicitation (NS) message that includes an address generated to perform a Duplicate Address Detection (DAD), to the whole network at operation S110. Accordingly, each node receives the NS message from all nodes that take part in the network.

Each node of the ad-hoc network receives the NS message and calculates a distance to a transmitting node that transmitted the NS message using information included in the NS message at operation S120. The NS message according to an embodiment of present invention includes hop limit information in its IP header. Accordingly, each node can calculate the number of hops of a path through which the NS message from the transmitting node is transmitted using the hop limit information included in the NS message.

The range of one hop in the ad-hoc network is related to a transmission range of each node, and the number of hops among nodes in the ad-hoc network is closely related to a time required for the communication. Thus, the actual topology of the ad-hoc network can be reflected using the calculated number of hops as a representative value of the distance from each node to each transmitting node.

Since each node of the ad-hoc network receives the NS message from other nodes, each node can calculate the number of hops to the all other nodes and prepare the neighbor node information list using the number of hops at operation S130. Each node calculates information such as the number of neighbor nodes located at a distance of one hop from the node, and the number of neighbor nodes located at a distance of two hops from the node, based on the number of hops to other nodes, and records the numbers of hops in the neighbor node information list.

Figure 2:
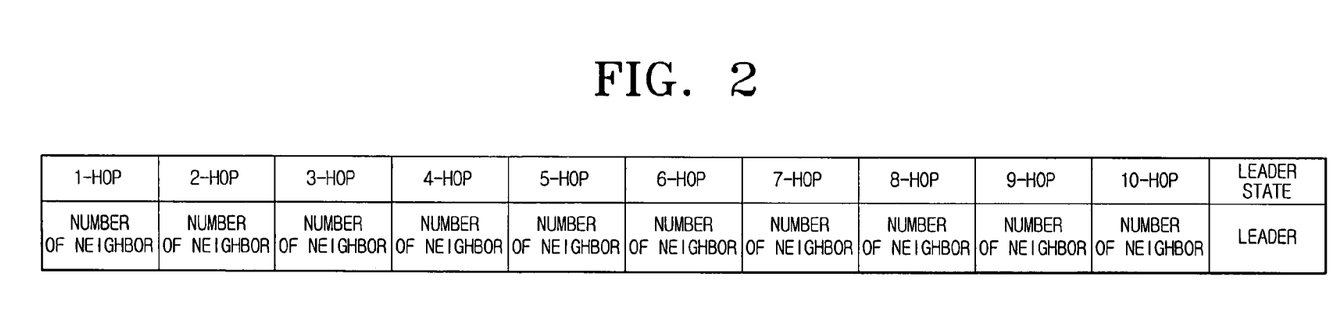
FIG. 2 is a view illustrating an example of a neighbor node information list kept by a respective node in the ad-hoc network.

FIG. 2 is a view illustrating an example of a neighbor node information list kept by a respective node in the ad-hoc network. Referring to FIG. 2, the number of neighbor nodes located at a one-hop to 10-hop distances from the corresponding node is recorded in the neighbor node information list. Information in a range wider than the above-described example may be recorded in the neighbor node information list in consideration of the size, and environment of the ad-hoc network. Each node records the neighbor node information list and updates the neighbor node information list at a predetermined time interval so as to maintain the newest information.

Then, each node calculates its own center position value in the network based on the number of nodes located at distances corresponding to each hop recorded in the neighbor node information list at operation S140. The center position value is calculated by the following equation 1:

$$P = \sum_{K=1}^{M} \alpha_K * N_K \quad \text{[Equation 1]}$$

wherein "M" denotes a certain natural number, "$\alpha_K$" denotes a weight value ($a_1 \neq a_2 \neq a_3 \neq a_4 \neq \ldots \alpha_K$), and "$N_K$" denotes the number of transmitting nodes located at a distance corresponding to the number of hops "K" from the corresponding nodes. The weight value "$\alpha_K$" can be determined according to the characteristic of the ad-hoc network.

For example, of "M=3", the center position value "P" becomes "P=$\alpha_1 \times N_1 + \alpha_2 \times N_2 + \alpha_3 \times N_3$". Each node compares the calculated center position value "P" with the threshold value "T", and if the center position value "P" is equal to or larger than the threshold value "T", the node determines itself as the candidate leader at operation S150. The threshold value "T", for example, may be "5".

Each node that determined itself as the candidate leader transmits the leader election optional message to the whole network at operation S160.

Figure 3:
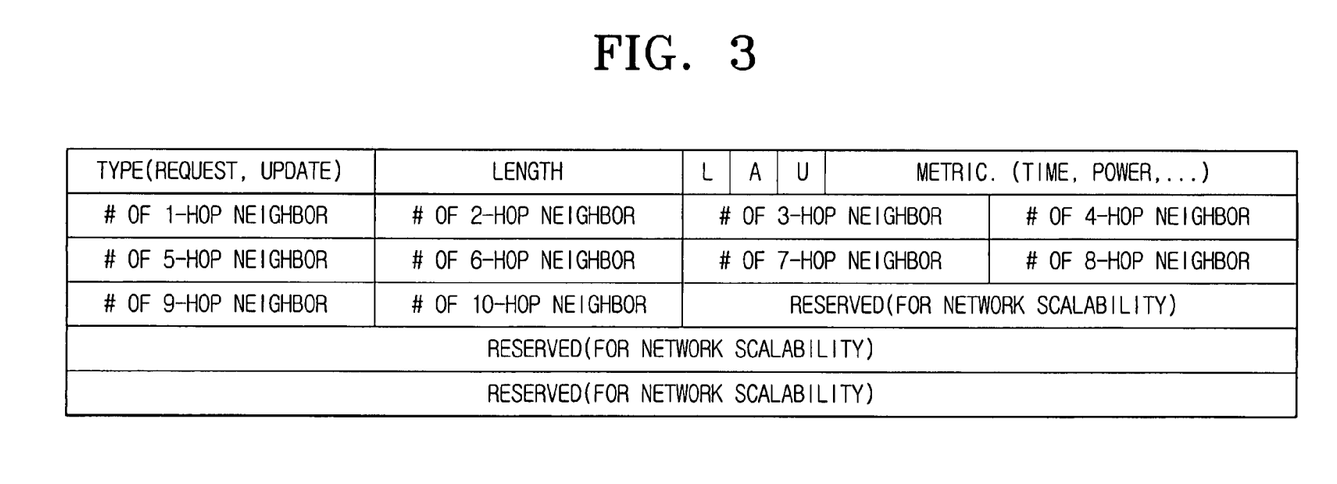
FIG. 3 is a view illustrating an example of a leader election option message according to an embodiment of the present invention.

FIG. 3 is a view illustrating an example of a leader election option message according to an embodiment of the present invention. Referring to FIG. 3, the candidate leader includes information about the number of neighbor nodes located at a distance corresponding to the number of hops of its own neighbor node information list, in the leader election option message to transmit the message. The candidate leader also informs that the candidate leader itself is the leader by setting an "L" bit as shown in FIG. 3.

Upon receiving the leader election option message from another candidate leader, the candidate leader calculates the center position value of the candidate leader using the information included in the received leader election option message, and compares the calculated center position value with its own center position value. The candidate leader receives the leader election option message and gives up becoming the leader node, that is, determines itself not the leader node, if its center position value is smaller than the center position value of the other candidate leader. As a result, the candidate node that has the largest center position value is elected as the leader node at operation S170.

Figure 4A:
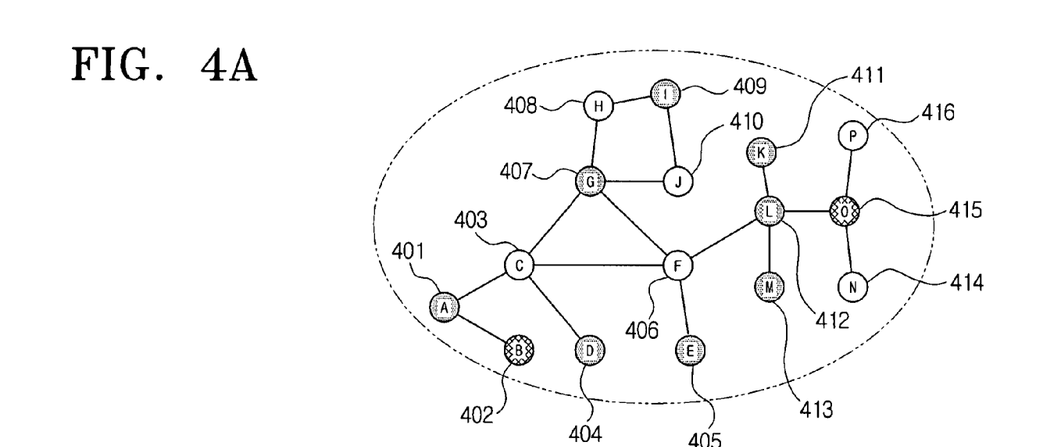
FIG. 4A is a view illustrating an example of the ad-hoc network according to an embodiment of the present invention.
Figure 4B:
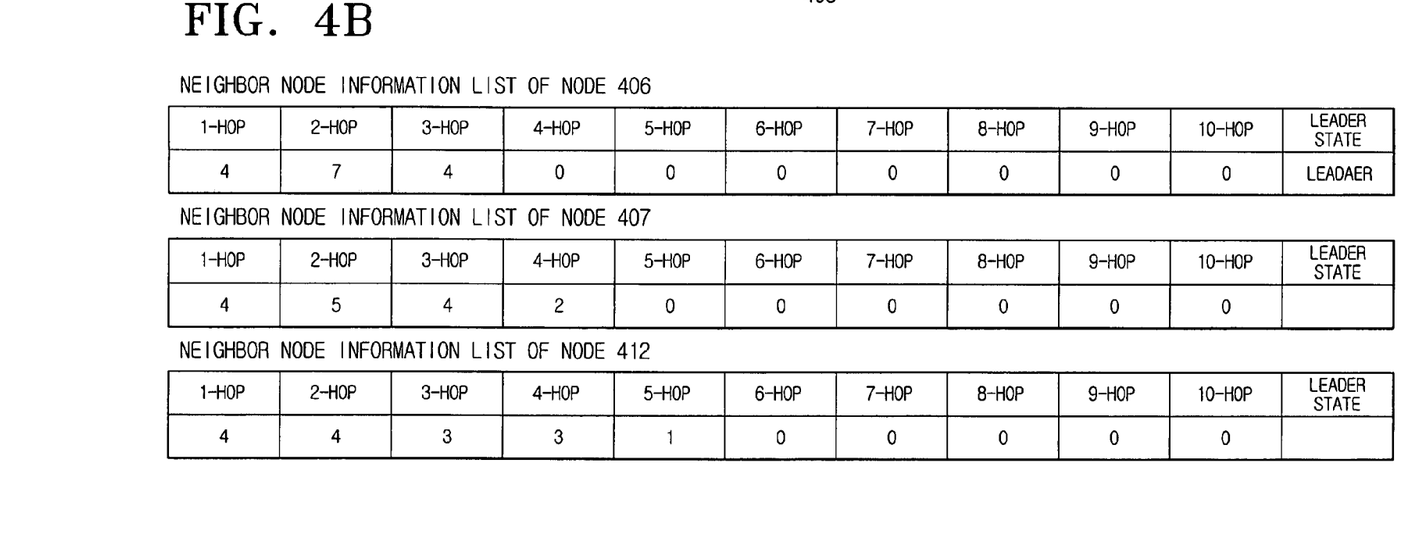
FIG. 4B is a view illustrating an example of a neighbor information list of a predetermined node of FIG. 4A.

FIG. 4A is a view illustrating an example of the ad-hoc network according to an embodiment of the present invention, and FIG. 4B is a view illustrating an example of a neighbor information list of a predetermined node of FIG. 4A. Referring to FIGS. 4A and 4B, the ad-hoc network includes 1st through 16th nodes 401 through 416.

When the ad-hoc network is created, each node transmits the NS message to the whole network. Each node also calculates the number of hops to other nodes by using the information included in the NS messages received from other nodes, and prepares the neighbor node information list using the calculated number of hops.

Each node calculates its own center position value using the information recorded in its own neighbor node information list, and if the center position value is more than a predetermined number, for example, more than "5", the node determines itself to be the candidate leader. FIG. 4B illustrates the neighbor node information list kept by the 6th, 7th and 12th nodes 406, 407 and 412 that are the candidate leaders.

For example, the weight value $\alpha_K$ in the equation 1 is set to "1", the natural number "M" is set to "3", and the threshold value "T" is set to "5". Accordingly, the center position value of the 6th node 406 calculated by using the neighbor node information list is "1×4+1×7+1×4=15", the center position value of the 7th node 407 is "1×4+1×5+1×4=13", and the center position value of the 12th node 412 is "1×4+1×4+1×3=11". As a result, all the center position values of the 6th, 7th and 12th nodes 406, 407 and 412 are larger than "5", and thus they are determined as the candidate leaders.

The 6th, 7th and 12th nodes 406, 407 and 412, which are the candidate leaders, transmit the leader election option messages including their own neighbor node information to the whole network. Each candidate leader calculates the center position values of other candidate leaders using the information included in the received leader election option messages, and compares with its own center position value.

The 7th node 407 has its center position value of "13", which is smaller than the center position value "15" of the 6th node 406 according to the information included in the leader election option message received from the 6th node 406. Thus, the 7th node 407 gives up becoming the leader.

The 12th node 412 has the center position value of "11", which is smaller than the center position values "15" or "13" of the 6th node 406 and the 7th node 407 according to the information included in the leader election option messages received from the 6th node 406 and the 7th node 407, respectively. Thus, the 12th node 412 gives up becoming the leader.

The 6th node 406 has the center position value of "15", which is larger than the center position values "13" or "11"of the 7th node 407 and the 12th node 412 according to the information included in the leader election option messages received from the 7th node 407 and the 12th node, respectively. Thus, the 6th node is elected as the leader.

Figure 5:
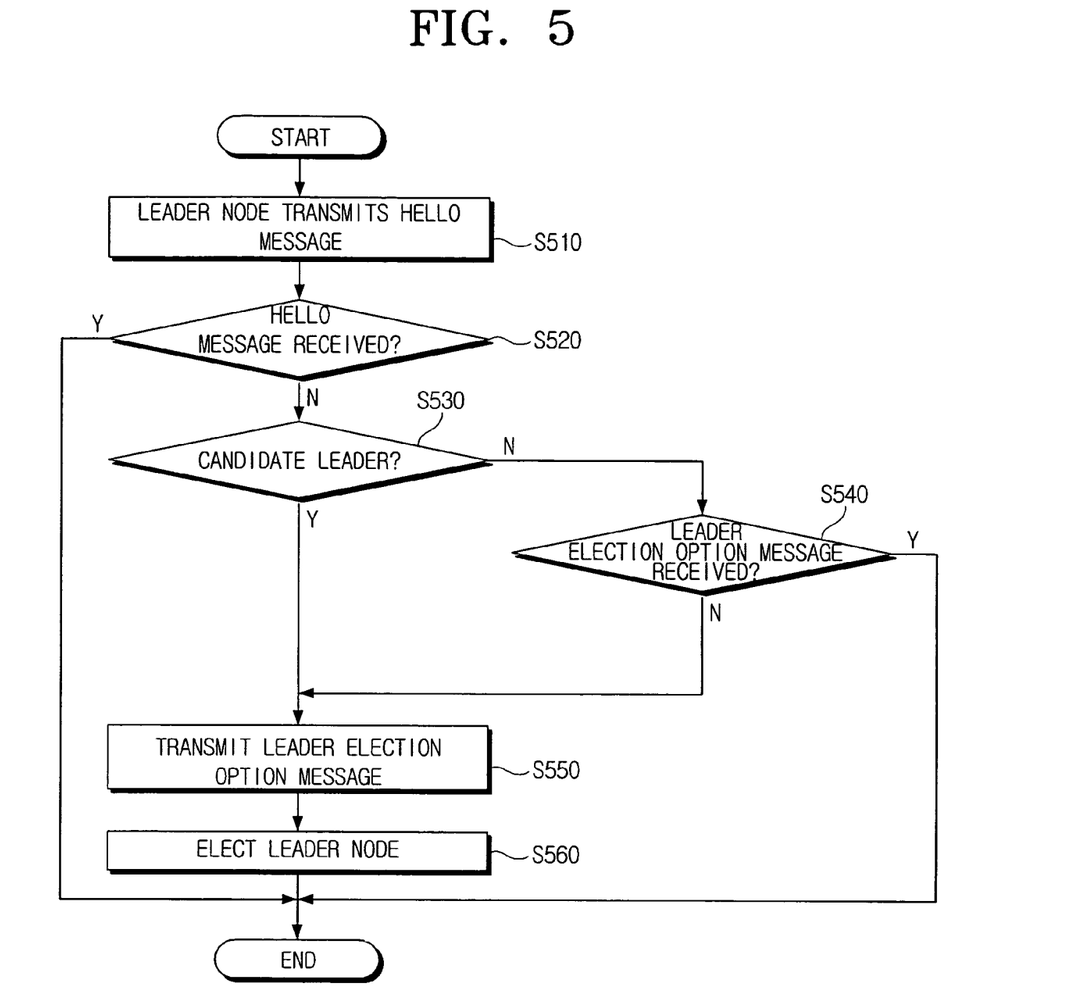
FIG. 5 is flowchart illustrating a method of electing a new leader node when a leader node moves in the ad-hoc network according to an embodiment of the present invention.

FIG. 5 is flowchart illustrating a method of electing a new leader node when a leader node moves in the ad-hoc network according to an embodiment of the present invention. Since each node in the ad-hoc network has mobility, the leader node may also move from the present network to another ad-hoc network. If the leader node leaves the network, a new leader should be elected. The leader node electing method in this case will be described with reference to FIG. 5.

The leader node periodically transmits a hello message to the whole network at operation S510. According to a Mobile Ad-hoc Network (MANET) routing protocol, the hello message is used to maintain the neighbor node information. The leader node according to an embodiment of the present invention may periodically transmit the hello message, while indicating that the node itself is the leader node. Each neighbor node determines whether the hello message is received from the leader node at operation S520 and confirms the existence of the leader node. If each neighbor node fails to receive the hello message from the leader node, the neighbor nodes can detect the movement of the leader node.

If the hello message is not received from the leader node, the neighbor node of the leader node detects the movement of the leader node and determines whether itself is the candidate leader at operation S530. The method of determining whether the node itself is the candidate leader is as described above. If there is any node determined as the candidate leader, the corresponding candidate leader transmits the leader election option message to the whole network at operation S550, and the leader node is elected among the candidate leaders as described above at operation S560.

Each node that is not the candidate leader determines whether the leader election option message is received from other nodes for a predetermined time (Random_Delay_Time) at operation S540. If there is no candidate leader among the neighbor nodes, the neighbor node could not receive the leader election option message until the predetermined time elapses. Accordingly, the neighbor node determines itself as the candidate leader and transmits the leader election option message at operation S550, and the leader node is elected among the candidate leaders at operation S560.

Figure 6:
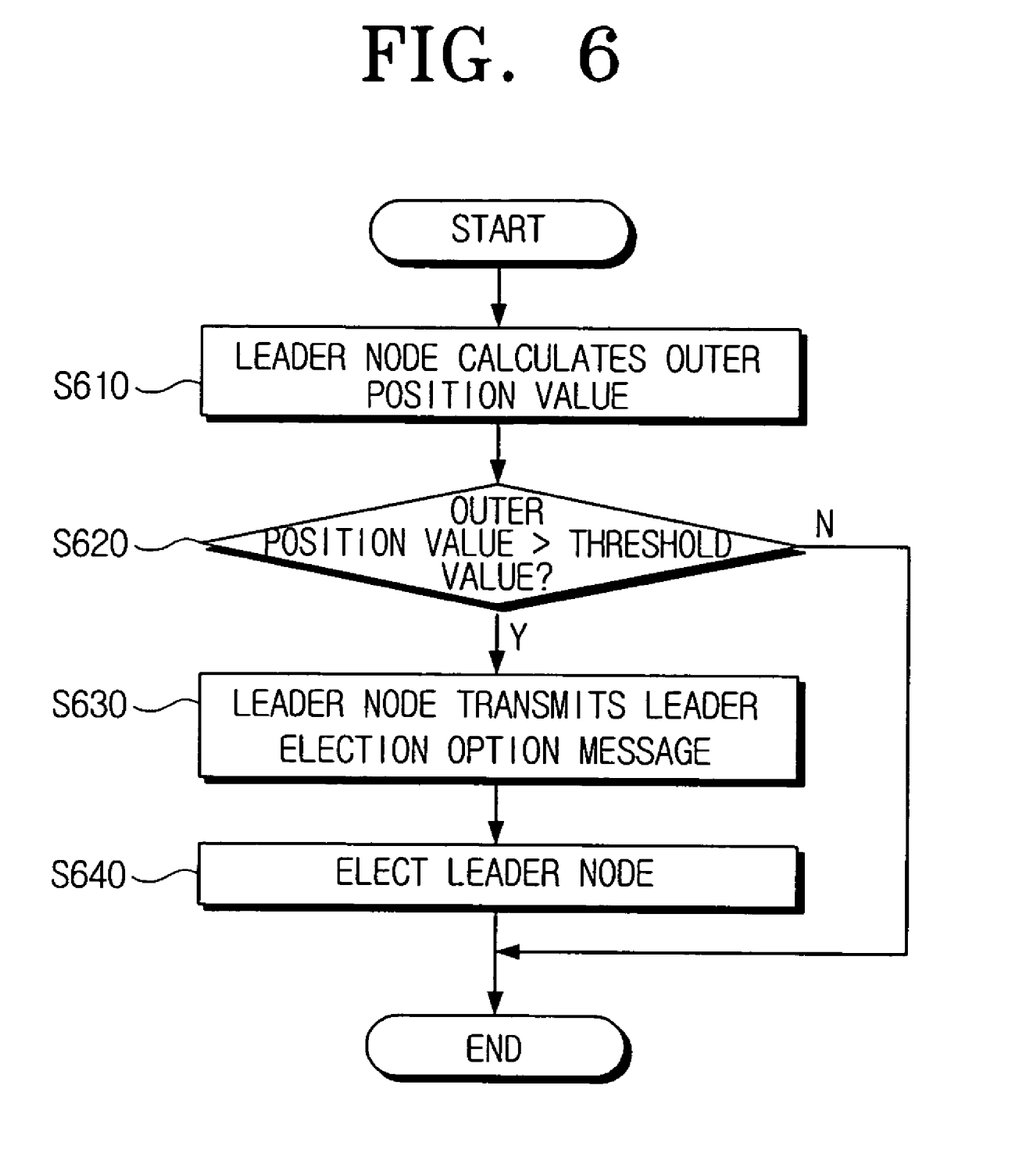
FIG. 6 is flowchart illustrating a method of electing a new leader node in accordance with the topology change of the ad-hoc network according to an embodiment of the present invention.

FIG. 6 is flowchart illustrating a method of electing a new leader node in accordance with the topology change of the ad-hoc network according to an embodiment of the present invention. The topology of the network may change due to various reasons such as a new node taking part in the presently created ad-hoc network.

If a new node takes part in the ad-hoc network, the corresponding node transmits an NS message to the whole network so as to perform the DAD. The existing nodes in the ad-hoc network receive the transmitted NS message and update their own neighbor node information lists using the information included in the NS message. The new node requests and receives the neighbor node information lists from the existing nodes, and prepares its own neighbor node information list using the received neighbor node information lists.

If the neighbor node information list is updated by the new node taking part in the network, the leader node calculates its own outer position value at operation S610. The outer position value "OP" is defined by the following equation 2:

$$OP = \sum_{K=I}^{M} \alpha_K * N_K \qquad \text{[Equation 2]}$$

wherein "I" denotes a natural number that is larger than "1", "M" denotes a certain natural number that is larger than "I", "$\alpha_K$" denotes a weight value ($a_1 \neq a_2 \neq a_3 \neq a_4 \neq \ldots \alpha_K$, or they may be equal to one another), and "$N_K$" denotes the number of neighbor nodes located at a distance corresponding to the number of hops "K" from the corresponding node. The weight value "$\alpha_K$" can be determined according to the characteristic of the ad-hoc network and is not limited to the embodiments of the present invention.

For example, if "I=4", "M=10" and "$\alpha_K$=1", the outer position value "OP" of the leader node becomes "OP=$\alpha_4 \times N_4 + \alpha_5 \times N_5 + \alpha_6 \times N_6$"+ . . . +$\alpha_{10} \times N_{10}$".

The leader node compares the calculated outer position value with the threshold value "T" at operation S620, and if the outer position value "OP" is larger than the threshold value "T", the leader node transmits the leader election option message to the whole network in order to re-elect the leader node at operation S630. For example, the threshold value "T" may be "10".

Each node, which has received the leader election option message from the leader node, compares the center position value of the leader node with the center position value of its own neighbor node information list after subtracting the outer position value from its own center position value. If the value obtained by subtracting the outer position value from its own center position value is larger than the center position value of the leader node, the node determines to be the candidate leader and transmits the leader election option message with the "L" bit set, to the whole network.

The candidate leader is finally elected as the leader node if no leader election option message is transmitted from other candidate leaders for the predetermined time or if it is determined that its own center position value is larger than that of any other candidate leader through the comparison of its own center position value with the information included in the leader election option messages transmitted from other candidate leaders at operation S640.

As described above, in the method of electing a leader node in an ad-hoc network according to an embodiment of the present invention, an efficient management of the ad-hoc network becomes possible. Accordingly, a suitable leader node is elected in accordance with the changes in the circumstances such as the creation of an ad-hoc network, topology change of the ad-hoc network, and movement of a general node and the leader node. Furthermore, the DAD is rapidly performed using the elected leader node or the elected leader node is applied to the network extension.

Also, the method according to an embodiment of the present invention can be applied to the merge of the network or the DAD among the networks, and also to the regional division or clustering of the ad-hoc network.

The aforementioned method of electing a leader node in an ad-hoc network may be embodied as a computer program that can be run by a computer, which can be a general or special purpose computer. Computer programmers in the art can easily reason codes and code segments, which constitute the computer program. The program is stored in a computer readable medium readable by the computer. When the program is read and run by a computer, the method of electing a leader node in an ad-hoc network is performed. Here, the computer-readable medium may be a magnetic recording medium, an optical recording medium, firmware, or other recordable media.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of electing a leader node in an ad-hoc network comprising a plurality of nodes, the method comprising:
   transmitting node solicitation (NS) messages and calculating distances between the plurality of nodes using information included in the NS messages transmitted from the plurality of nodes;
   determining whether the plurality of nodes are candidate leaders by calculating position values of each node based on the distances calculated by each node;
   electing the leader node based on information included in leader election option messages transmitted by each of the candidate leaders;
   periodically transmitting a hello message indicating that the elected leader node is the leader node;
   determining whether each node neighboring the leader node receives a hello message from the leader node;
   determining whether each neighboring node qualifies as candidate leader if each neighboring node does not receive the hello message;
   transmitting a leader election option message from each neighboring node which qualifies as candidate leader and electing the leader node if at least one neighboring node is determined to be the candidate leader,
   wherein no leader election option message is transmitted if no neighboring node qualifies as candidate leader; and
   wherein each node that is not candidate leader determines whether the leader election option message is received from other nodes for a predetermined period of time; and
   determining each neighboring node to be qualified as candidate leader after the predetermined period of time has elapsed and electing the leader node among candidate leaders.

2. The method as claimed in claim 1, further comprising preparing neighbor node information lists based on the distances calculated by each node,
   wherein each node calculates the position values of each node based on the neighbor node information lists.

3. The method as claimed in claim 2, wherein the distances between the plurality of nodes are calculated by a number of hops, which is a number of transmissions of the NS messages from the plurality of nodes using hop limit information included in Internet protocol (IP) headers of the NS messages.

4. The method as claimed in claim 3, wherein the neighbor node information lists of each node includes a number of the plurality of nodes located at a distance corresponding to a number of hops "K" from each node, wherein "K" is a natural number.

5. The method as claimed in claim 4, wherein the leader election option messages transmitted by each candidate leader include the neighbor node information lists.

6. The method as claimed in claim 5, wherein the candidate leader having a largest value obtained from a following equation, which is calculated according to the neighbor node information lists of each candidate leader, is elected as the leader:

$$\sum_{K=1}^{M} \alpha_K * N_K$$

wherein "M" denotes a predetermined natural number, "$\alpha_K$" denotes a weight value, and "$N_K$" denotes the number of the plurality of nodes located at a distance corresponding to the number of hops "K" from the candidate leaders.

7. The method as claimed in claim 3, wherein the nodes that satisfy the following equation are determined as the candidate leaders:

$$\sum_{K=1}^{M} \alpha_K * N_K \geq T$$

wherein "M" denotes a predetermined natural number, "T" denotes a predetermined threshold value, "$\alpha_K$" denotes a weight value, and "$N_K$" denotes the number of the plurality of nodes located at a distance corresponding to the number of hops "K" from the candidate leaders.

8. The method as claimed in claim 1, further comprising:
   when a new node takes part in the ad-hoc network, requesting the neighbor node information lists to the plurality of nodes, and preparing an own neighbor node information list; and
   the plurality of nodes calculating distances to the new node using information included in a received NS message from the new node and updating the neighbor node information lists, respectively.

9. The method as claimed in claim 1, further comprising transmitting the leader election option message from the leader node to the plurality of nodes of the ad-hoc network if the following equation is satisfied:

$$OP = \left(\sum_{K=1}^{M} \alpha_K * N_K\right) T'$$

wherein OP denotes outer position value, "I" denotes a predetermined natural number that is larger than "1", "M" denotes a certain natural number that is larger than "I", "αK" denotes a weight value, "NK" denotes the number of neighbor nodes located at a distance corresponding to the number of hops "K" from the leader node, and "T" denotes a predetermined threshold value.

10. The method as claimed in claim 3, wherein a topology of the ad-hoc network is obtained using the number of hops as a representative value of the distance from each node.

11. The method as claimed in claim 2, wherein each node records the neighbor node information lists and updates the neighbor node information lists at a predetermined time interval maintaining the neighbor node information lists updated.

12. The method as claimed in claim 1, wherein the information included in the leader election option message transmitted by each of the candidate leaders includes information about a number of neighbor nodes located at a distance corresponding to a number of hops from a neighbor node information lists.

13. The method as claimed in claim 1, wherein a candidate leader having a largest position value is elected as the leader node.

14. A computer readable medium encoded with processing instructions executed by a processor to perform a method of electing a leader node in an ad-hoc network comprising a plurality of transmitting nodes, the method comprising:

transmitting node solicitation (NS) messages and calculating distances between the plurality of transmitting nodes using information included in the NS messages transmitted from the plurality of transmitting nodes;

determining whether the plurality of transmitting nodes themselves are candidate leaders by calculating position values of each node based on the distances calculated between each of the plurality of transmitting nodes;

electing the leader node based on information included in leader election option messages transmitted by each of the candidate leaders;

periodically transmitting a hello message indicating that the elected leader node is the leader node;

determining whether each node neighboring the leader node receives a hello message from the leader node;

determining whether each neighboring node qualifies as candidate leader if each neighboring node does not receive the hello message;

transmitting a leader election option message from each neighboring node which qualifies as candidate leader and electing the leader node if at least one neighboring node is determined to be the candidate leader, wherein no leader election option message is transmitted if no neighboring node qualifies as candidate leader; and wherein each node that is not candidate leader determines whether the leader election option message is received from other nodes for a predetermined period of time; and determining each neighboring node to be qualified as candidate leader after the predetermined period of time has elapsed and electing the leader node among candidate leaders.

15. The computer readable medium as claimed in claim 14, further comprising preparing neighbor node information lists based on the distances calculated by each of the plurality of transmitting nodes, wherein each of the plurality of transmitting nodes calculates the position values of each node based on the neighbor node information lists.

16. The computer readable medium as claimed in claim 15, wherein the distances between the plurality of transmitting nodes are calculated by a number of hops, which is a number of transmissions of the NS messages from the plurality of transmitting nodes, using hop limit information included in Internet protocol (IP) headers of the NS messages.

17. The computer readable medium as claimed in claim 16, wherein the neighbor node information lists of each node includes a number of the plurality of transmitting nodes located at a distance corresponding to a number of hops "K" from each node, wherein "K" is a natural number.

18. The computer readable medium as claimed in claim 17, wherein the leader election option messages transmitted by each candidate leader include the neighbor node information lists.

19. The computer readable medium as claimed in claim 18, wherein the candidate leader having a largest value obtained from a following equation, which is calculated according to the neighbor node information lists of each candidate leader, is elected as the leader node:

$$\sum_{K=1}^{M} \alpha_K * N_K$$

wherein "M" denotes a predetermined natural number, "$\alpha_K$" denotes a weight value, and "$N_K$" denotes the number of transmitting nodes located at a distance corresponding to the number of hops "K" from the candidate leaders.

20. The computer readable medium as claimed in claim 16, wherein the plurality of transmitting nodes that satisfy the following equation are determined as the candidate leaders:

$$\sum_{K=1}^{M} \alpha_K * N_K \geq T$$

wherein "M" denotes a predetermined natural number, "T" denotes a predetermined threshold value, "$\alpha_K$" denotes a weight value, and "$N_K$" denotes the number of transmitting nodes located at a distance corresponding to the number of hops "K" from the candidate leaders.

21. The computer readable medium as claimed in claim 14, further comprising:

when a new node takes part in the ad-hoc network, requesting the neighbor node information lists to the plurality of transmitting nodes, and preparing a neighbor node information lists; and the plurality of transmitting nodes calculating distances to the new node using information included in a received NS message from the new node and updating the neighbor node information lists, respectively.

22. The computer readable medium as claimed in claim 14, further comprising transmitting the leader election option message from the leader node to the plurality of transmitting nodes in the ad-hoc network if the following equation is satisfied:

$$OP = \sum_{K=1}^{M} \alpha_K * N_K \rangle T'$$

wherein OP denotes outer position value, "I" denotes a predetermined natural number that is larger than "1", "M" denotes a certain natural number that is larger than "I", "αK" denotes a weight value, "NK" denotes the number of neighbor nodes located at a distance corresponding to the number of hops "K" from the leader node, and "T" denotes a predetermined threshold value.

23. The computer readable medium as claimed in claim 16, wherein a topology of the ad-hoc network is obtained using the number of hops as a representative value of the distance from each of the plurality of transmitting nodes.

24. The computer readable medium as claimed in claim 15, wherein each of the plurality of transmitting nodes records the neighbor node information lists and updates the neighbor node information lists at a predetermined time interval maintaining the neighbor node information lists updated.

25. The computer readable medium as claimed in claim 14, wherein the information included in the leader election option message transmitted by each of the candidate leaders includes information about a number of neighbor nodes located at a distance corresponding to a number of hops from a neighbor node information lists.

26. The computer readable medium as claimed in claim 14, wherein a candidate leader having a largest position value is elected as the leader node.

27. A method of electing a leader node in an ad-hoc network comprising a plurality of nodes, the method comprising:

transmitting node solicitation (NS) messages and calculating distances between nodes using information included in the NS messages;

determining candidate leaders by calculating position values of each node based on the calculated distances;

electing the leader node based on information included in leader election option messages transmitted by the candidate leaders;

periodically transmitting a hello message indicating that the elected leader node is the leader node;

determining whether each node neighboring the leader node receives a hello message from the leader node;

determining whether each neighboring node qualifies as candidate leader if each neighboring node does not receive the hello message;

transmitting a leader election option message from each neighboring node which qualifies as candidate leader and electing the leader node if at least one neighboring node is determined to be the candidate leader, wherein no leader election option message is transmitted if no neighboring node qualifies as candidate leader; and wherein each node that is not candidate leader determines whether the leader election option message is received from other nodes for a predetermined period of time; and determining each neighboring node to be qualified as candidate leader after the predetermined period of time has elapsed and electing the leader node among candidate leaders.

28. The method as claimed in claim 27, further comprising preparing neighbor node information lists based on the calculated distances, wherein each node calculates the position values of each node based on the neighbor node information lists.

* * * * *

UNITED STATES PATENT AND TRADEMARK OFFICE
CERTIFICATE OF CORRECTION

| | | |
|---|---|---|
| PATENT NO. | : 7,532,585 B2 | Page 1 of 1 |
| APPLICATION NO. | : 10/962518 | |
| DATED | : May 12, 2009 | |
| INVENTOR(S) | : Jae-hoon Kim et al. | |

It is certified that error appears in the above-identified patent and that said Letters Patent is hereby corrected as shown below:

First Page, Column 2 (Other Publications), Line 1, change "Pardeep" to --Pradeep--.

Column 11, Line 7, change "OP" to --"OP"--.

Column 11, Line 9, change ""αK"" to --"α$_K$"--

Column 11, Line 10, change ""NK"" to --"N$_K$"--.

Column 11, Line 12, change ""T"" to --"T'"--.

Column 13, Line 5, change the formula from " $$OP = \sum_{K=1}^{M} \alpha_K * N_K )T'$$ " to -- $$OP = \sum_{K=1}^{M} \alpha_K * N_K )T'$$ --.

Column 13, Line 10, change "OP" to --"OP"--.

Column 13, Line 13, change ""αK" to --α$_K$--.

Column 13, Line 13, change ""NK"" to --"N$_K$"--.

Column 13, Line 16, change ""T"" to --"T'"--.

Signed and Sealed this

Fourth Day of May, 2010

David J. Kappos
*Director of the United States Patent and Trademark Office*